United States Patent [19]

Longardner et al.

[11] Patent Number: 5,449,571
[45] Date of Patent: Sep. 12, 1995

[54] ENCAPSULATIONS FOR THERMAL MANAGEMENT SYSTEM FOR BATTERY

[75] Inventors: William J. Longardner; Alexander P. Rafalovich; Gilbert P. Keller; Thomas C. Schmidter; Joseph A. Gustin, all of Indianapolis, Ind.

[73] Assignee: Store Heat and Produce Energy, Inc., Indianapolis, Ind.

[21] Appl. No.: 158,950

[22] Filed: Nov. 29, 1993

[51] Int. Cl.$^6$ .............................................. H01H 2/02
[52] U.S. Cl. ................................. 429/120; 429/148; 429/163; 429/177
[58] Field of Search ............... 429/120, 163, 148, 177

[56] References Cited

U.S. PATENT DOCUMENTS 4,629,622 12/1986 Vonezu et al. .......................... 429/57
5,051,322 9/1991 Hasenauer ............................ 429/120
5,212,025 5/1993 Shibata et al. ........................ 429/120

FOREIGN PATENT DOCUMENTS 43-22512 12/1974 Japan .
54-322512 12/1979 Japan .
2125156 2/1984 United Kingdom .

Primary Examiner—Prince Willis, Jr.
Assistant Examiner—M. Nuzzolillo
Attorney, Agent, or Firm—Barnes & Thornburg

[57] ABSTRACT

An encapsulation apparatus is provided for a thermal management system for at least one battery. The apparatus comprises a housing including an inner wall defining a receptacle for the battery. The inner wall is positioned in thermal contact with the battery. The housing further comprises an outer wall in spaced-apart relationship with the inner wall to define an enclosure therebetween for receiving a phase change material.

7 Claims, 3 Drawing Sheets

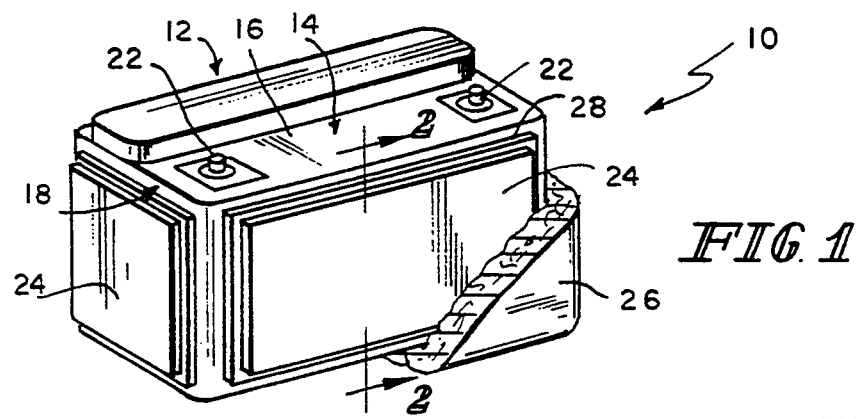
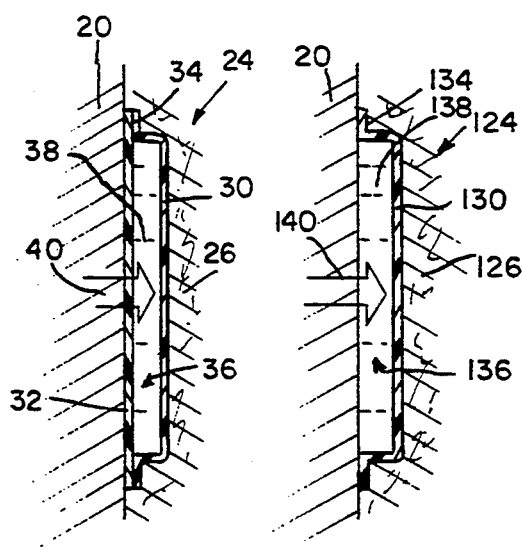
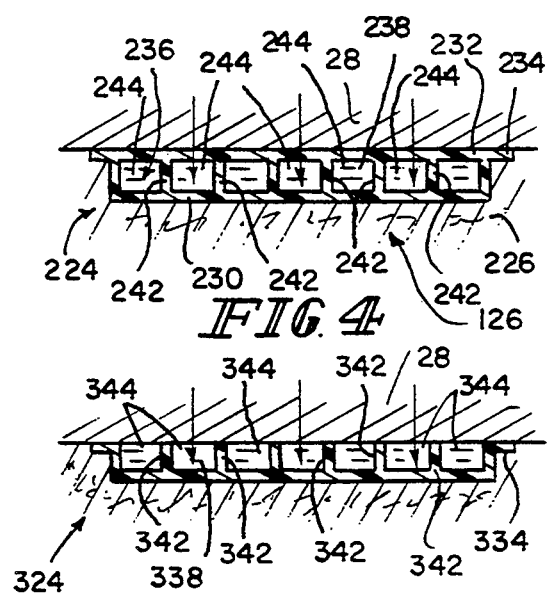

ENCAPSULATIONS FOR THERMAL MANAGEMENT SYSTEM FOR BATTERY

BACKGROUND AND SUMMARY OF THE INVENTION

The present invention relates to encapsulations for phase change material to be used in a thermal management system for a vehicle's electric battery or set of electric batteries. More particularly, the present invention relates to encapsulations which place phase change materials in thermal contact with a vehicle's electric batteries to remove heat generated by the batteries during operation and either discharge it or store it for later use.

Designers of electrical systems for vehicles and the like have recognized that conventional lead acid or nickel cadmium batteries and the like may lose thirty percent or more of their cranking power, operational capacity, and charge acceptance as temperatures in the immediate operating environment of the battery reach levels beyond the preferred thermal envelope. Furthermore, fluctuating battery temperatures can cause uneven thermal gradients across the battery, compounding the operational shortfalls. The life expectancy of a lead-acid battery, for example, decreases if the temperature in the immediate operating environment rises above 27°–30° C. for an extended period, and decreases substantially if temperatures rise above 45° C.

With the advent of hybrid and electric vehicles, this problem has taken on even more significant proportions. Most current designs for electric cars call for banks of electric batteries which must be packed into single or multiple closed compartments. These batteries generate substantial amounts of heat during operation, particularly where high power is required, such as during hill climbing, acceleration, and regenerative braking. This heat, if it cannot be dissipated quickly and uniformly, adversely affects the performance of the batteries. Thus, there is a need to provide a system for thermal management of electric batteries in order to offset this detrimental temperature rise.

There are primarily two existing methods to thermally manage batteries: forced convection of air over the surface of the battery, and the circulation of heat transfer liquids around the battery. On a hot summer day, the air flow may be too warm to absorb any heat from the battery. Conversely, on a cold winter day, the battery may in fact be overcooled to a temperature far less than desired. For air circulation to be effective, air passages must be provided between batteries to allow for air flow while the vehicle is in motion, or a supplemental fan must be used. Both of these methods require additional ducting, control systems, and other complexities. Additionally, the heat transfer from air to a battery wall is often not adequate for quick cooling or heating.

Thermal management systems which circulate heat transfer liquid around a battery also have disadvantages. These systems typically require circulating water (if not an antifreeze solution), pumps, a radiator, and a variety of controls. These components significantly raise the cost, size, weight and complexity of the vehicle.

Another key problem with existing thermal management systems is their inability to maintain optimum, uniform temperatures within a battery block. It is very important that batteries be kept within specified temperature ranges if optimal battery performance and long life are to be achieved. When multiple batteries are used in a system such as those in an electric vehicle this problem becomes more apparent. Temperature differences between the cells of the batteries lead to capacity differences in these cells. This imbalance causes some cells to be either over discharged or overcharged during vehicle operation which then leads to premature failure of the battery.

Some previous thermal management systems have not even attempted to maintain uniform temperatures over extended time periods, but rather have focused on providing instantaneous warming. Some such battery warmers have used phase change materials ("PCMs") to instantaneously raise the temperature of the battery electrolyte to a desired level. PCMs, alone or combined in eutectic mixtures, release or store heat of transition as they change phase between liquid and solid. PCMs typically have high latent heats of fusion such that significant amounts of energy can be "stored" as the solid PCMs melt, while significant amounts of energy can be dissipated to a heat sink or the like as the liquid PCMs solidify.

For example, U.K. Patent Application 2,125,156 discloses the use of PCMs in sealed bags in the battery electrolyte or even contained in the separator plates to place the PCM in intimate thermal contact with the electrolyte. When the liquid PCM discharges heat to the surrounding electrolyte over a short period of time, the temperature of the electrolyte rises to a desired level. The PCM gradually undergoes phase change to the solid state and must be reheated to be used again. Another is example is Japanese Patent Application No. S43-22512.

According to the present invention, an encapsulation apparatus is provided for a thermal management system for at least one electric battery. The encapsulation apparatus comprises a housing including an inner wall defining a receptacle for the at least one battery. The inner wall being positioned in thermal contact with the at least one battery. The apparatus further includes an outer wall positioned in spaced-apart relationship with the inner wall to define an enclosure therebetween for receiving a phase change material. Advantageously, the encapsulation operates in the thermal management system to absorb heat generated by the battery during vehicle operation, frequent cycling, and rapid charge, so that the temperature of the battery electrolyte remains within an acceptable range, avoiding performance losses associated with high temperature battery operation. In addition, the encapsulated PCM operates to prevent the temperature of the battery electrolyte from falling below a critical range during periods of inactivity or in cold weather environments contingent upon the amount of heat in storage and ambient conditions.

Further in accordance with the present invention, an encapsulation apparatus is provided for a thermal management system for at least one electric battery, the electric battery including a case having a plurality of faces. The encapsulation apparatus comprises at least one panel formed to include an interior region for receiving a phase change material, and means for affixing the at least one panel to a face of the electric battery case to place the phase change material in heat transfer relationship with the battery case.

Yet further in accordance with the present invention, a battery case is provided. The battery case comprises an exterior shell, and an interior shell positioned in a spaced apart relationship with the exterior shell to define a region for receiving phase change material.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of an encapsulation apparatus for use in a thermal management system in accordance with the present invention including a plurality of PCM-filled panels affixed to a battery case;

FIG. 2 is a sectional view along lines 2—2 of FIG. 1 showing a PCM-filled panel with a backing plate affixed in thermal contact with a battery case;

FIG. 3 is a sectional view similar to that of FIG. 2 showing a PCM-filled panel without a backing plate affixed in thermal contact with a battery case;

FIG. 4 is a top sectional view of another embodiment of the present invention showing a PCM-filled panel including a plurality of channels and a backing plate affixed in thermal contact with a battery case;

FIG. 5 is a view similar to that of FIG. 4 showing a PCM-filled panel without a backing plate and including a plurality of channels, the panel being affixed in thermal contact with a battery case;

DETAILED DESCRIPTION OF THE DRAWINGS

Figure 6:
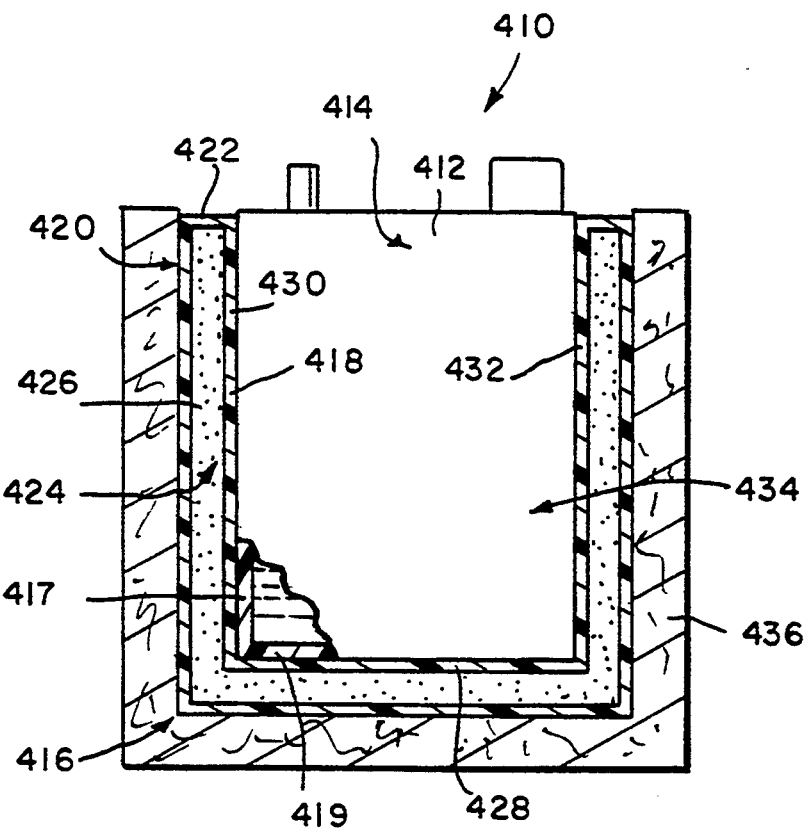
FIG. 6 is a view of yet another embodiment of the present invention showing a PCM-filled housing including a receptacle for a battery.

Encapsulations for use in thermal management systems of the present invention serve to contain PCMs in a wide variety of cartridges, panels, housings, and the like. These various encapsulations are designed to position the PCM in heat exchange relationship with typical electric batteries used in vehicles and the like. Encapsulated PCM in accordance with this invention can absorb heat generated by batteries during operation and can assist in maintaining a higher battery temperature in cold conditions with no requirement for auxiliary power sources, as long as stored heat is available.

A wide variety of PCMs may be used in connection with the present invention. PCMs are typically chosen based upon their latent heat characteristics, but may also be selected for their additional qualities, such as congruent melting, minimal supercooling. Typical classes of PCMs usable in accordance with this invention include paraffin waxes, eutectic mixtures of salts, salt hydrate solutions, and water.

Preferred PCMs are calcium chloride hexahydrate solutions of the type described in U.S. Pat. Nos. 4,272,390; 4,613,444; and 4,412,931, relevant portions of which are hereby incorporated by reference. Such solutions have excellent latent heat characteristics, low electrical conductivity, and outstanding fire retardant capability, such that encapsulated PCMs in accordance with the present invention may assist in preventing the ignition and spread of electrical fires originating at the battery. Other salt hydrate solutions contemplated as being useful in accordance with the claimed invention include $CaBr_2.6H_2O$ (e.g. as described in U.S. Pat. No. 4,690,769), mixed calcium halide hexahydrates (e.g. as described in U.S. Pat. No. 4,637,888), magnesium nitrate hexahydrate (e.g. as described in U.S. Pat. Nos. 4,272,391; 5,271,029; and 4,273,666), magnesium chloride hexahydrate (e.g. as described in U.S. Pat. Nos. 4,338,208 and 4,406,805), mixtures of magnesium nitrate hexahydrate and magnesium chloride hexahydrate (e.g. as described in U.S. Pat. Nos. 4,272,392; 4,329,242; and 4,402,846), mixtures of magnesium nitrate hexahydrate and ammonium nitrate (e.g. as described in U.S. Pat. No. 4,283,298), and certain gelled PCMs (e.g. as described in U.S. Pat. No. 4,585,572).

As shown in FIG. 1, an encapsulation for a thermal management system 10 in accordance with one embodiment of the present invention is used to manage the temperature of electrolyte in a typical electric battery 12. Battery 12 includes a case 14 having a top face 16, bottom face (not shown), and side faces 18, 20. A pair of terminals 22 extend through top face 16 for connection to the remaining electrical system.

Encapsulations in the form of PCM-filled cartridges or panels 24 are affixed to faces 18, 20 to provide a heat sink. The number of panels 24 can vary. Panels 24 may be affixed to one or all of side faces 18, 20, and may also be affixed to top face 16 and the bottom face if desired.

Any of a variety of well-known fastening means can be used to affix panels 24 to case 14 in such a way as to minimize air gaps between panels 24 and battery case 14. Preferably, adhesives are chosen which will not significantly impede heat transfer between panel 24 and case 14. One particularly suitable adhesive is IPS Weld-On 2395, manufactured by Industrial Polychemical Service. Alternatively, a plurality of mechanical fastening means (not shown) may be provided, or case 14 may be custom-designed with grips or slots directly molded in to receive panels 24.

Regardless of the means used to affix panel 24 to case 14, panel 24 must be maintained in heat transfer contact with case 14. To assist in placing panel 24 in good heat exchange relationship with case 14, one may apply thermally conductive grease or liquid to faces 18, 20 (or to any other faces of case 14 to be contacted by a panel 24).

Thermal management system 10 also may include insulation 26 wrapped around battery case 14 and panels 24 for cold weather conditions. Heat transferred from the battery electrolyte is thus used to melt the PCMs in panel 24 rather than escaping to the surrounding operating environment. Insulation 26 may be permanent or removable. One preferred insulation material is RA series insulation manufactured by Owens-Corning.

As shown in FIG. 2, panel 24 may be a panel of clear polystyrene or other plastic or suitable material which may provide an interior region 36 for PCM up to approximately two inches thick. Panel 24 may be manufactured by any of a variety of well-known techniques depending upon the type of material used and the characteristics of the PCM. For polystyrene panels used to house the preferred PCM's described herein, processes such as vacuum molding, rotational molding, injection molding, or blow molding may typically be used.

Panel 24 is preferably sized to be in intimate thermal contact with the entire face to which it is affixed, although it may contact less than the entire face. Although the dimensions of the panel will vary, panels 24 can conveniently be sized to cover a given face of battery case 14. In addition, panel geometries offering high surface area-to-volume ratios are most preferred.

It will be recognized that a variety of materials can be used to fabricate panels 24. Plastic, rubber, or metal materials and structures may be used. Flexible or rigid constructions may be used.

Panel 24 includes a container portion 30 and a backing plate 32 which is sealed or otherwise affixed to a peripheral flange 34 on container portion 30. Container portion 30 and backing plate 32 cooperate to provide interior region 36 for receiving PCMs 38. PCMs 38 will typically occupy about 85–100% of interior region 36 when PCMs 38 are in the solid state. The remaining 15–0% is left for expansion space. If a flexible encapsulation is used, no expansion space typically need be left.

As indicated by arrow 40, heat generated inside battery 12 as a result of battery charge and discharge is transferred through face 20 of battery case 14 and then through backing plate 32 to reach PCMs 38 in interior region 36. The PCMs 38 effectively serve as a heat sink, "extracting" heat that would otherwise raise the temperature of the battery electrolyte, using it instead to melt PCMs 38.

In a typical operation for manufacturing panel 24 and packing PCMs 38 into interior region 36, a vacuum-molding operation may be used to form container portion 30 and backing plate 32. When container portion 30 fully hardens, backing plate 32 is sealed to flange 34, and liquid PCM 38 is poured into container portion 30 through a fill port (not shown) which is then sealed.

Panel 24 operates as part of thermal management system 10 as follows. During normal vehicle operation, the temperature of the electrolyte in battery 12 is at approximately normal levels, and PCMs 38 are in the solid state. As the vehicle continues to operate and the battery cycles, the temperature inside battery 12 is likely to rise. Heat is first transferred through case 14 and then through backing plate 32, and then into interior region 36 to melt the PCM.

PCM 38 selected is dependent on the specific battery type. A PCM 38 with a phase change temperature near the ideal operating temperature of battery 12 is preferred. Accordingly, as the vehicle operates, the batter 12 generates heat and the temperature in the interior region 36 begins to rise. The PCM 38 absorbs heat generated by battery 12 sensibly until the temperature of PCM 38 rises to its phase change temperature. At this point any further heat generated by the battery is absorbed as the latent heat of fusion of PCM 38 until all of the PCM 38 is melted. After all of PCM 38 is melted, additional heat is absorbed sensibly in the liquid PCM. Effectively, heat from battery 12 is absorbed and stored both sensibly and as the latent heat of fusion of the PCM rather than continuing to raise the temperature inside battery 12. Optional insulation 26 prevents significant dissipation of heat from the PCM 38 to the surrounding environment. Thus while the vehicle is operating the PCM 38 absorbs heat from battery 12 and may store it and release it when the operating temperature of battery 12 drops below a desired level.

Panel 24 can also operate as a warmer for electric battery 12 during periods of vehicle/battery inactivity in cold temperatures—e.g., when the vehicle has been parked in cold weather conditions. PCM 38, which has previously been brought into the liquid state by the heat generated during vehicle operation as described above, can be used to transfer thermal energy from the liquid PCM 38 through backing plate 32 to the electrolyte inside battery case 14. The thermal energy released by PCM 38 as it undergoes phase transition from liquid to solid is used to maintain a higher temperature in the battery electrolyte, and advantageously helping to avoid problems associated with cold weather operations.

Another embodiment of a panel for use in accordance with the present invention is shown in FIG. 3. Panel 124 is shown to include a container portion 130 having a peripheral flange 134 but does not include a backing plate. Where the backing plate is excluded, it is critical that flange 134 be tightly sealed directly against face 20 of battery case 14 to prevent leakage of PCMs 138 from interior region 136. In this embodiment, then, container portion 130 cooperates with face 20 of battery case 14 to define interior region 136 for containing PCMs 138. In other respects, the embodiment of the present invention illustrated in FIG. 3 is similar to that illustrated in FIG. 2.

Yet another embodiment of the present invention is illustrated in FIG. 4. A panel 224 as shown in FIG. 4 includes a container portion 230 and a backing plate 232 sealed to a peripheral flange 234 on container portion 230. Container portion 230 and backing plate 232 cooperate to define an interior region 236.

A plurality of divider walls 242 extend in interior region 236 in parallel, spaced-apart relationship to define a plurality of channels 244 therebetween. The number of divider walls 242 and their orientation relative to the battery wall may vary. PCMs 238 occupy each of the plurality of channels 244. Divider walls 242 are sealed to backing plate 232.

A number of advantages derive from the use of multiple divider walls 242. Divider walls 242 provide structural integrity to panel 224 and provide a plurality of natural expansion and contraction regions for PCMs 238, making it less likely that PCMs 238 will breach panel 224 and leak out. In addition, even if an individual divider wall 242 fails, the structural integrity of the remainder of panel 224 will not be compromised.

The use of multiple channels 244 also assists in regulating crystal growth of salt hydrate PCMs during phase change. Divider walls 242 may assist crystal growth by providing increased surface area for crystal nucleation as PCM 238 solidifies. Divider walls 242 also control the growth and orientation of large linear crystals that may puncture or otherwise damage panel 224. Divider walls 242 also may deter PCM stratification. In addition, multiple, horizontal divider walls 242 prevent large blocks of solid PCM particles from accumulating at the bottom of interior region 236 which helps maintain a consistent heat/sink source across the surface of the battery face.

A divider wall 242 of highly conductive material may also play a role in enhancing heat transfer. Advantageously, because divider walls 242 directly contact backing plate 232, and backing plate 232 in turn contacts battery case 14, divider walls 232 allow some amount of heat transfer by conduction.

As shown in FIG. 5, a similar panel 324 excludes any backing plate. As with the embodiment of FIG. 3, it is critical that container portion 330 be tightly sealed against face 28 to prevent leakage of PCMs 338 from channels 344.

It is contemplated that panels of the type described above will be most useful to retrofit existing batteries where no PCM encapsulation was originally contemplated as part of the design. Where designs do contemplate PCM encapsulations for use as part of a thermal management system, a variety of alternatives to the panels may be proposed. One embodiment of an encapsulation for use in a thermal management system of this type is illustrated in FIG. 6. An encapsulation for a thermal management system 410 as shown in FIG. 6 utilizes a double-walled PCM encapsulation sized to accommodate at least one battery 412.

In particular, a housing 416 is provided to maintain PCMs in thermal contact with selected faces (including, for example, faces 417, 419) of case 414 of battery 412. Housing 416 may include an inner wall 418, an outer wall 420, and a top wall 422 connecting inner wall 418 and outer wall 420 in spaced-apart relationship to define an enclosure 424. PCMs 426 occupy enclosure 424.

Housing 416 can be constructed of a variety of materials, although durable plastics of the type preferably used for the panels described above are also preferably used for housing 416. Housing 416 can be fabricated using manufacturing techniques familiar to those of ordinary skill in the art.

Inner wall 418 of housing 416 may include a bottom face 428, side faces 430, 432 two additional side faces (in the plane of the paper) which together cooperate to define a receptacle 434 for at least one battery 412. Battery 412 fits tightly into receptacle 434 so that bottom face 428, faces 430, 432 are in direct contact with battery case 414. Of course, it will be appreciated that receptacle 434 can be sized to accommodate a series of batteries positioned, for example, in two parallel rows in which adjacent batteries directly contact each other.

Optionally, insulation 436 is provided. It may also be desirable to provide a plurality of extended surfaces or fins (not shown) extending between inner wall 418 and outer wall 420 through enclosure 426. Such extended surfaces enhance heat transfer away from battery case 414 and improve structural stability of enclosure 426. It may alternatively be desirable to provide a plurality of extended surfaces or fins (not shown) extending outwardly from outer wall 420. The position of such extended surfaces may be varied and the number of extended surfaces will be selected in accordance with art-recognized heat transfer design criteria.

Figure 7:
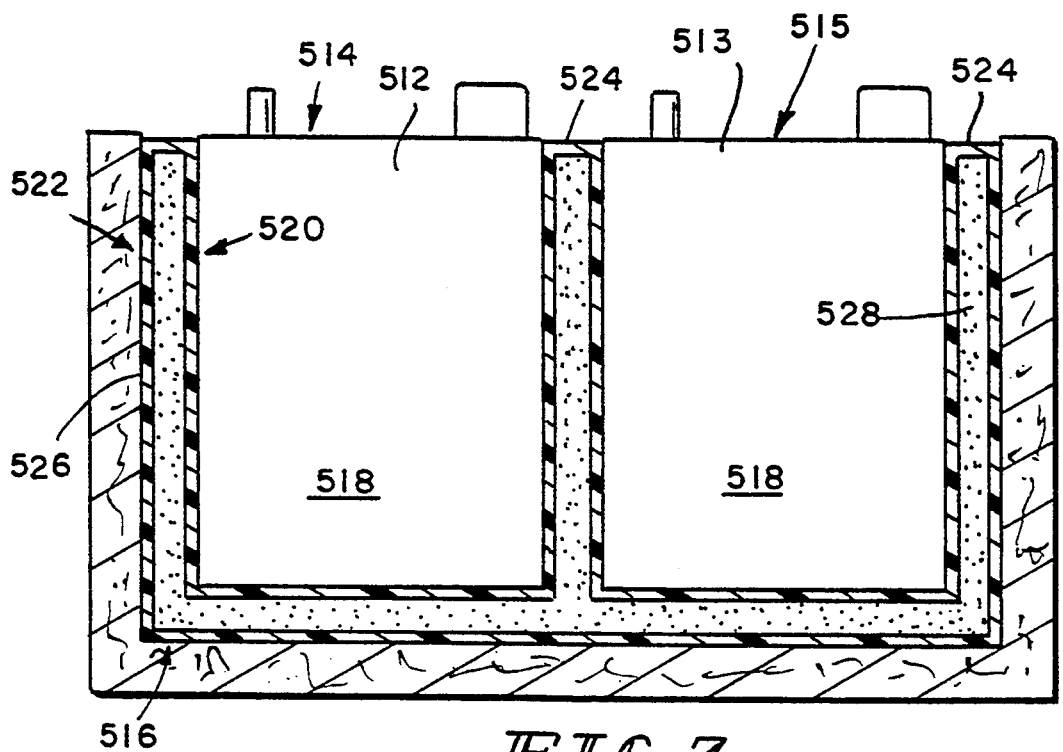
FIG. 7 is a view of yet another embodiment of the present invention showing a PCM-filled housing with a plurality of receptacles for receiving batteries; and, FIG. 8 is a view of yet another embodiment of the present invention showing a battery case designed to provide a region for receiving PCMs.

Another embodiment of a double-walled PCM encapsulation or housing is illustrated in FIG. 7. Housing 516 is formed to include multiple receptacles 518 to receive a plurality of electrically connected batteries, two of which, battery 512 and battery 513, are shown. Housing 516 is particularly suitable for electric and hybrid vehicles having a series of batteries, typically arranged in multiple rows. In other respects, the embodiment of FIG. 7 is similar to the embodiment of FIG. 6. The operation of encapsulations as part of thermal management systems 410 and 510 illustrated in FIGS. 6 and 7 is similar to that of the encapsulations for thermal management system 10 as previously described.

Optionally, with any of the preferred embodiments discussed herein, panels or other encapsulations (similar, for example, to those illustrated in FIGS. 2-5) can be filled with PCMs as previously described and can be inserted into the battery itself during the battery manufacturing process. Such panels are mounted within the battery for intimate contact with the battery electrolyte such that thermal energy generated in the battery electrolyte can be absorbed. Standard fasteners are used to maintain the panels in a proper location, and the number and arrangement of the panels may vary depending upon the application.

Figure 8:
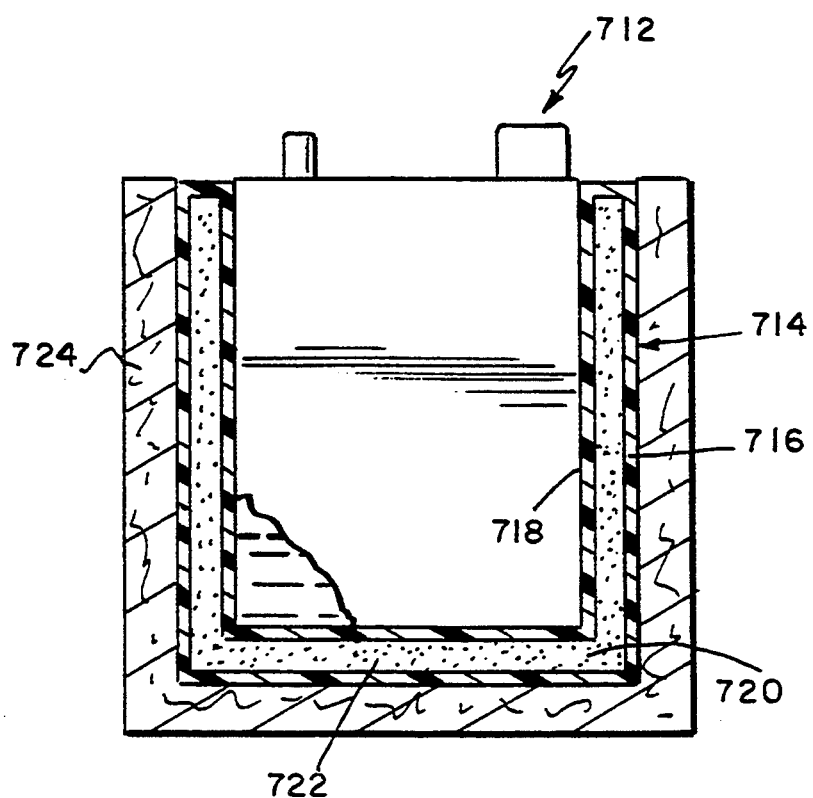

Yet a further embodiment of the present invention is illustrated in FIG. 8. In FIG. 8, a battery 712 includes a case 714 having an exterior shell 716 and an interior shell 718. Exterior shell 716 lies in spaced-apart relationship with interior shell 718 so as to define an interior region 720 for receiving PCMs 722. Additional features as previously described with regards to other embodiments of the present invention may also be incorporated into the embodiment of FIG. 8. Thus, for example, divider walls such as those illustrated in FIG. 4 may be formed in interior region 720. Fins or extended surfaces as previously described may also be used. Internal panels mounted within the battery electrolyte may be included. Optional insulation 724 may also be added. In other respects, the embodiment of FIG. 8 operates in the same manner as previously-described embodiments.

Although the invention has been described in detail with reference to certain preferred embodiments, variations and modifications exist within the scope and spirit of the invention as described and defined in the following claims.

We claim:

1. An encapsulation apparatus for a thermal management system for at least one electric battery, the apparatus comprising a housing including an inner wall defining a receptacle for the at least one battery, the inner wall being positioned in thermal contact with the at least one battery, an outer wall in spaced-apart relationship with the inner wall to define an enclosure therebetween for receiving a phase change material, and a plurality of fins extending from the inner wall into the enclosure to facilitate heat transfer between the inner wall and the phase change material in the enclosure.

2. An encapsulation apparatus for a thermal management system for at least one electric battery, the apparatus comprising a housing including an inner wall defining a receptacle for the at least one battery, the inner wall being positioned in thermal contact with the at least one battery, an outer wall in spaced-apart relationship with the inner wall to define an enclosure therebetween for receiving a phase change material, and a plurality of fins extending from the outer wall to facilitate heat transfer from the outer wall to the surrounding environment.

3. An encapsulation apparatus for a thermal management system for at least two electric batteries, the apparatus comprising a housing including an inner wall positioned in thermal contact with the at least two batteries and an outer wall in spaced-apart relationship with the inner wall to define an enclosure there between for receiving a phase change material, the inner wall being configured to define at least two receptacles in spaced-apart relative relationship to accommodate the at least two electric batteries.

4. An encapsulation apparatus for a thermal management system for at least one electric battery, the electric battery including a case having a plurality of faces, the apparatus comprising at least one panel formed to include an interior region for receiving a phase change material, means for affixing the at least one panel to a face of the electric battery case to place the phase change material in heat transfer relationship with the face, and a plurality of divider walls positioned in the interior region in spaced-apart parallel relationship to divide the interior region into a plurality of channels for receiving the phase change material.

5. A battery case comprising an exterior shell, an interior shell positioned in spaced apart relationship with the exterior shell to define a region for receiving phase change material, and a plurality of divider walls positioned in the region in spaced-apart parallel relationship to divide the region into a plurality of channels for receiving the phase change material.

6. A battery case comprising an exterior shell, an interior shell positioned in spaced apart relationship with the exterior shell to define a region for receiving phase change material, and a plurality of fins extending from the exterior shell to facilitate heat transfer from the exterior shell to the surrounding environment.

7. In a thermal management system for an electric battery, the electric battery including a case having a plurality of faces, the improvement comprising at least one panel contacting at least one of the plurality of faces and being formed to include an interior region for receiving a phase change material, and a plurality of divider walls positioned in the interior region in spaced-apart parallel relationship to divide the interior region into a plurality of channels for receiving the phase change material.

* * * * *